US009563952B2

(12) United States Patent
Glimm et al.

(10) Patent No.: US 9,563,952 B2
(45) Date of Patent: Feb. 7, 2017

(54) DETERMINATION OF A MEASUREMENT ERROR

(71) Applicant: Trimble Jena GmbH, Jena (DE)

(72) Inventors: Andreas Glimm, Weimar (DE); Michael Vogel, Schleifreisen (DE)

(73) Assignee: Trimble Jena GmbH, Jena (DE)

( * ) Notice: Subject to any disclaimer, the term of this patent is extended or adjusted under 35 U.S.C. 154(b) by 231 days.

(21) Appl. No.: 14/253,082

(22) Filed: Apr. 15, 2014

(65) Prior Publication Data

US 2014/0375795 A1   Dec. 25, 2014

(30) Foreign Application Priority Data

Jun. 19, 2013  (DE) .................. 10 2013 211 492

(51) Int. Cl.

| G06K 9/00 | (2006.01) |
| G01C 25/00 | (2006.01) |
| G01B 11/26 | (2006.01) |
| G01B 11/00 | (2006.01) |
| G06T 7/00 | (2006.01) |
| G01C 15/00 | (2006.01) |
| G01S 7/497 | (2006.01) |

(52) U.S. Cl.
CPC ........... *G06T 7/0028* (2013.01); *G01C 15/002* (2013.01); *G01S 7/4972* (2013.01); *G06T 2207/10016* (2013.01); *G06T 2207/30181* (2013.01)

(58) Field of Classification Search
None
See application file for complete search history.

(56) References Cited

U.S. PATENT DOCUMENTS

| 2004/0184583 A1* | 9/2004 | Nagamine ................ A61B 6/04 378/209 |
| 2006/0055943 A1* | 3/2006 | Kawasaki ............ G01B 11/002 356/606 |
| 2007/0104353 A1* | 5/2007 | Vogel ...................... G01C 1/04 382/106 |
| 2007/0182952 A1* | 8/2007 | Nishita ................ G01C 15/002 356/139.04 |
| 2008/0130982 A1* | 6/2008 | Kitamura ................ G06K 9/00 382/144 |

(Continued)

FOREIGN PATENT DOCUMENTS

| DE | 10 2007 003 586 A1 | 8/2007 |
| EP | 2 523 017 A1 | 11/2012 |

*Primary Examiner* — Reza Aghevli
(74) *Attorney, Agent, or Firm* — Kilpatrick Townsend & Stockton LLP

(57) ABSTRACT

For swift and secure determination of a measurement error a first digital image is obtained using an image sensor, wherein a line of sight of an optical arrangement is oriented in a first face direction. A characteristic image area in the first digital image on an image sensor is determined. A second digital image is then taken with a line of sight of the image sensor oriented in a second face and the characteristic image area defined in the first image is searched in the second digital image, the first or the second digital image is rotated in the image plane by 180°. Then in the second digital image the position of the characteristic image area is determined. And offset between the characteristic image area in the first digital image and the characteristic image area in the second digital image is determined.

20 Claims, 11 Drawing Sheets

(56) References Cited

U.S. PATENT DOCUMENTS

| | | | |
|---|---|---|---|
| 2010/0020180 A1* | 1/2010 | Hill | H04N 5/2253 348/188 |
| 2011/0023578 A1* | 2/2011 | Grasser | G01C 15/00 73/1.75 |
| 2013/0127998 A1* | 5/2013 | Kobayashi | G01B 11/00 348/46 |
| 2013/0258115 A1* | 10/2013 | Hansson | H04N 5/232 348/187 |
| 2014/0009604 A1* | 1/2014 | Hinderling | G01C 15/002 348/142 |

* cited by examiner

DETERMINATION OF A MEASUREMENT ERROR

CROSS REFERENCE TO RELATED APPLICATIONS

This application claims priority to German Patent Application No. 10 2013 211 492.3, filed Jun. 19, 2013, the contents of which are incorporated herein by reference in their entirety for all purposes.

TECHNOLOGICAL BACKGROUND

The present invention relates to determining a measurement error of a measurement device.

Measurement devices, such as for example for optical surveying generally include an arrangement of optical elements are, that may me be used to aim at a target. Based on associated measurement scales angles, positions or other measurements can be carried out, for example related to the position of the object relative to the measurement device.

Such measurement devices generally include optical instruments, for example tachymeters, video-tachymeters or total stations. The optical arrangement of the measurement instrument may be a telescope allowing to aim at an object with the help of an ocular. The optical instrument may also include a camera or video camera, to obtain a representation of the object.

FIG. 11 illustrates in an exemplary manner such a measurement device, generally designated by reference numeral 1100. The optical arrangement 1101 of the measurement device is rotatable in a vertical plane around a preferably horizontal axis 1150, the so-called tilting axis or trunnion axis, so that it is possible to aim at objects in different elevations with respect to the measurement device. Besides this the optical arrangement 1101 is pivotable around a preferably vertically oriented axis 1151, also vertical axis, such as on a tripod plate 1102, enabling aiming at objects in different horizontal directions from the measurement device 1100. Analog or digital measurement scales are provided at the measurement device for example for the measured angles. Furthermore means for measuring or estimating a distance to the object may be provided.

Measurements on objects need to be carried out with highest accuracy to obtain the required accuracy for example in construction applications.

The measurement devices in the real world, however, are not infinitely accurate, such that each measurement on an object leads to measurement results that are affected by errors. These errors may perpetuate into the further processing and may lead to problems.

Due to manufacturing tolerances the rotational axes of the measurement device do not run fully vertical to one another, but only with certain deviations. The deviation of the angle between the tilting axis and the vertical axis from 90° generally is termed tilting axis error. The deviation of the angle between the tilting axis and the aiming axis, i.e. line of sight from 90° is generally termed side collimation error. Herein the aiming axis/line of sight is a predetermined optical axis of a telescope or other optical arrangement of the measurement device.

When measuring and angle to an object using the measurement device, these the deviations between the actual angle to the object and the angle indicated by the measurement device, that is the tilting axis error and the side collimation error, leads to an angle and rapport a measurement error, for example in horizontal or vertical direction. Therefore the measurement units often are adjusted or calibrated upon starting operation or during operation in certain intervals.

According to a known method for calibrating the measurement scales, the measurement device is first deployed and then oriented towards an object. Then the respective angle measurements are carried out in a so-called first face or face orientation, for example a measurement of a horizontal angle and a particular angle to towards the object. Then the optical device, for example the telescope of the measurement device, as illustrated in FIG. 11 by reference numeral 1101, is rotated by 180° around the vertical axis 1151, and furthermore by an angle of 360° minus a vertical angle, for example the zenith angle, between the telescope and be vertical axis, around the horizontal axis 1150. This process of internally tilting the measurement device is termed to snap through the measurement device. In this process the measurement device or rather the optical arrangement of the measurement device is transferred from a first face, in which the first measurement of the object was carried out, into a second to face. In the second face the second measurement of the object is carried out.

From the angle measurements in the first face and the second face of the tilting axis and the side collimation error may be derived. Calibration can be carried out by correcting the measurement scales of the measurement device on the basis of the tilting axis error and the side collimation error, such that for each subsequence measurement the measurement error is eliminated. A calibration may be carried out once, or before a series of measurements, or intervals between measurements.

Furthermore an object may generally also be measured in both face orientations of the instrument, such that for each measurement the errors may be corrected.

Calibration may, the more frequent it is carried out, require a considerable amount of time, which should be avoided.

SUMMARY OF THE INVENTION

In view thereof it is an object of the invention to determine measurement errors of a measurement device swiftly and securely.

This object of the invention is solved by the features of the independent claims. Advantageous embodiments of the invention are disclosed in the dependent claims.

THE DESCRIPTION OF THE DRAWINGS

FIG. 1 schematically illustrates a measurement instrument with a device for determining a measurement error according to an embodiment of the invention;

DETAILED DESCRIPTION OF THE PREFERRED EMBODIMENTS

While the below description exemplifies individual embodiments of the invention, it is understood that the respective embodiments may be combined with one another and that also individual features of embodiments may be combined with other embodiments or the features thereof.

Figure 1:
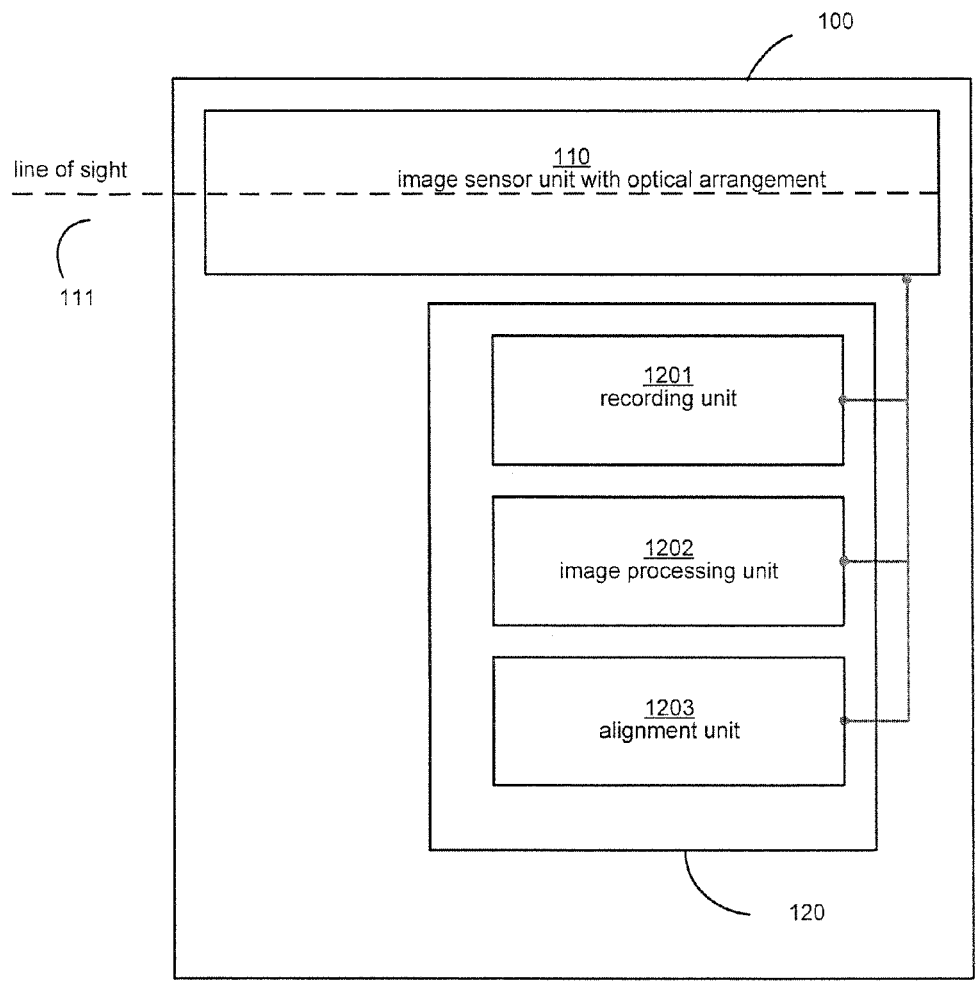

FIG. 1 shows a device for determining a measurement error of a measurement device according to an embodiment of the invention.

The measurement device is generally designated by 100 and includes image sensor elements with an optical arrangement 110 that has a line of sight 111 that may be oriented to towards an object to be imaged. Using the image sensor unit it is for example possible to obtain a digital representation of an object.

Moreover, FIG. 1 illustrates a device for determining a measurement error or measurement error determination device 120 for determining a measurement error of the measurement device 100 and for compensating the measurement error or multiple components of the measurement error, if applicable.

The measurement error determination device 120 includes a recording unit 1201 for obtaining a first digital image having a plurality of pixels by using the image sensor unit, wherein a line of sight of the optical arrangement of the image sensor arrangement is oriented in a first face.

An image processing unit 1202 of the measurement error determination device 120 is provided for determining a first characteristic image area in the first digital image, and for determining pixel positions of characteristic image content on the image sensor unit 110.

And alignment unit 1203 is provided for orienting the line of sight 111 of the optical arrangement of the image sensor unit 110 in a second face, as for example outlined above.

In the embodiment to the image processing unit 1202 is arranged to find the characteristic image area in a second digital image obtained by the recording unit 1201 in the second face of the image sensor unit, wherein the first or the second digital image is rotated by 180° in the image plane, pixel positions of pixels of the characteristic image area in the second digital image are determined on the image sensor unit, and wherein an offset between the pixel positions of the characteristic image area in the first digital image on the image sensor unit, and the pixel positions of the characteristic image area in the second digital image on the image sensor unit are determined as measurement errors.

The measurement error may stem from inaccuracies during measurement due to production tolerances, or may be a systematic measurement error. For example, the measurement error may have a vertical offset component in the image plane of the first and second digital image as well as a rotational component in the image plane of the images.

The measurement unit the 100 in the embodiment may be a theodolite or any other measurement unit for surveying spatial arrangements of objects.

Figure 11:
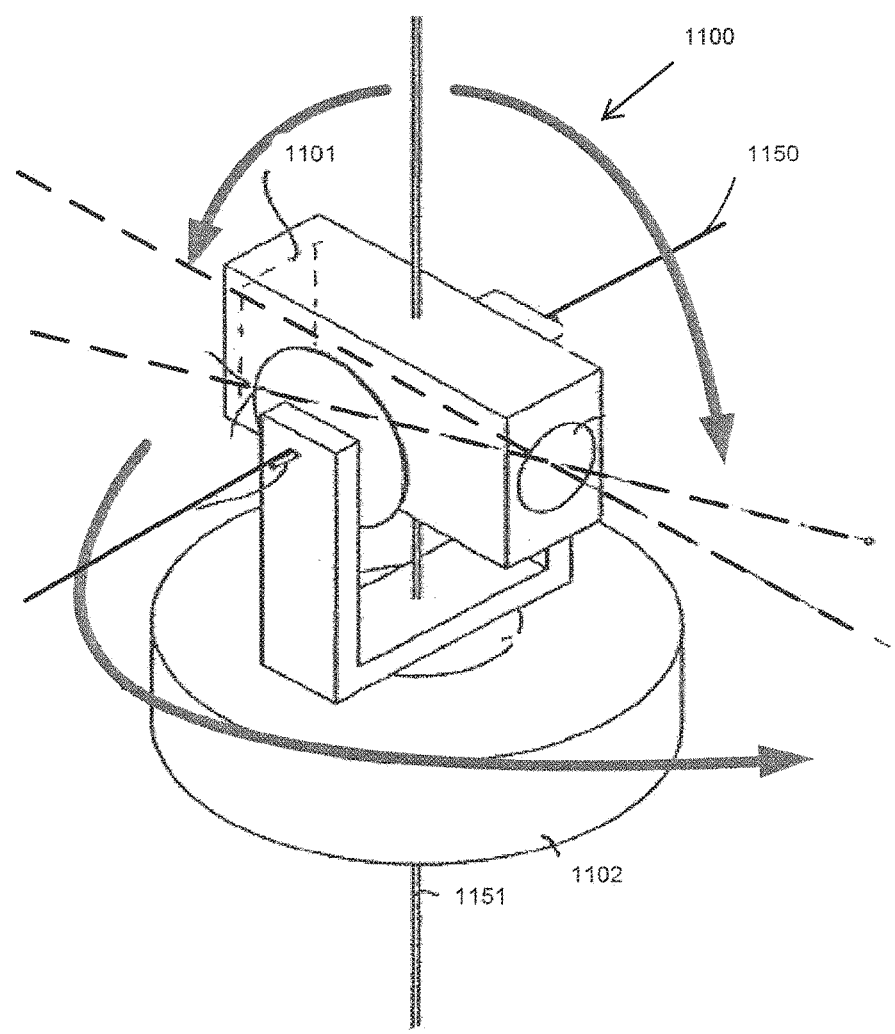
FIG. 11 illustrates an exemplary measurement instrument.

For example, the measurement unit 100 may include a tripod for stably positioning the measurement unit 100 for user operation in the field. As shown in FIG. 11 the tripod may include on the upper side a tripod plate 1102, upon which an optical arrangement is mounted. As described, the optical arrangement may preferably be rotatable around a vertical axis, as illustrated in FIG. 11 by reference numeral 1151. Moreover the optical arrangement may be rotatable around a second preferably horizontal axis 1150.

Such a measurement unit may for example be employed in land surveying, construction site surveying, for example highway construction, and similar.

The image sensor unit with the optical arrangement 110 may be any kind of optical arrangement allowing to provide a digital image of an object aimed at, as for example an image sensor unit with a digital image sensor, for example CCD or similar, equipped with a lens arrangement as for example a telescope. Moreover, the image sensor unit with optical arrangement may be a digital camera, used as a part of the measurement unit.

The measurement error determination device 120 may, as shown in FIG. 1, be located within the measurement unit, but may also at least partially be arranged outside of the measurement unit and may communicate via wired or wireless communication with the measurement unit. For example, the image processing unit 1202 may be implemented in an external processing unit. Such an external processing unit may be used to outsource computationally complex calculations, for reducing the processing requirements for the processing unit of the measurement unit and/or power consumption.

The measurement error determination device 120 may be provided as a software solution, hardware solution or as a combination of software and hardware. The measurement error determination device 120 may also be implemented on the basis of using hardware resources of the measurement unit, or may use a separate processing unit, such as a separate processor.

Moreover, functions of the measurement error determination device 120 may be stored as a program of a computer readable medium, and may be read into a data processing unit of the measurement instrument for carrying out the functions.

Briefly said, for quickly and securely determining a measurement error of the measurement unit, a first digital image may be obtained using the image sensor unit, wherein a line of sight of the optical arrangement is oriented in a first face. A characteristic image area in the first digital image and the position thereof on the image sensor unit may then be determined. A second digital image is obtained with the line of sight of the image sensor unit being oriented in a second face, and the characteristic image area defined in the first image is searched for in the second digital image, wherein preceding thereto the first or the second digital image is rotated by 180° in the image plane. The position of the characteristic image area on the image sensor unit is determined in the second digital image.

An offset between the characteristic image area the first digital image and the characteristic image area in the second digital image quantifies a measurement error. In a further embodiment, for finding the characteristic image area, the image processing unit 1202 may superimpose the characteristic image area onto the second digital image, obtained in the second face of the image sensor unit, after 180° rotation in the image plane of one of the images, and may then perform a step by step shift with respect thereto. The pixel values of the characteristic image area of the first digital image are then correlated with the pixel values of the second digital image, for determining a maximum correlation coefficient.

If the characteristic image area is shifted step-by-step with respect to the second digital image and the respective superimposed pixel values of the characteristic image area and of the second digital image, that is pixel values at the same position on the image sensor unit, are correlated with one another, an offset of the characteristic image area can be found, for which the characteristic image area as far as possible coincides with an area of the second digital image, as generally at this position the correlation value between the characteristic image area and the corresponding area of the second digital image is maximum.

If for example the characteristic image area exhibits an area of 100×100 pixels, these 100×100 pixels are correlated with corresponding 100×100 pixels of the second digital image at each possible position of the characteristic image area in the second digital image. If by way of the maximum correlation the position of the characteristic image area in the second digital image has been found, an offset for example in x and y direction can be determined as measurement error based on the thereby obtained position of the characteristic image area in the second digital image and the original position in the first digital image, of course each on the image sensor unit, and the respective pixel positions on the images sensor unit.

Naturally, other image processing schemes may be used for finding the characteristic image area of the first digital image in the second digital image. A number of matching algorithms are known in the art for this purpose.

Preferably the characteristic image area in the first digital image may be determined in the vicinity of a position of the line of sight on the image sensor unit. For example a user may aim, upon starting the determination of a measurement error, the image sensor unit with the optical arrangement towards an object deemed suitable, such that the line of sight of the optical arrangement is oriented towards the object. The line of sight herein preferably is the center axis of the optical arrangement, for example marked by a crosshair in an ocular, in the embodiment by a corresponding position on the image sensor unit.

The characteristic area may now advantageously be defined as a geometric area around this position of the line of sight on the image sensor unit, for example in a central position thereof, but also at each other position. Various shapes of the characteristic image area are conceivable, such as a square, a rectangle, a circle or any other shape. Moreover an object may also be determined in the first digital image using image segmentation methods, for example based on bright-dark transitions and may be defined as characteristic image area.

While the line of sight preferably runs through a central location of the image sensor unit and the optical arrangement, it is also conceivable that the line of sight does not run through the center of the image sensor unit, generally any position on the image sensor unit may define a line of sight.

An image sensor unit for obtaining digital images includes a limited number of pixel positions, whereat light sensitive elements are positioned. Images sensor units may include several millions of pixel positions, such that digital images obtained by them comprise several million pixels. Nevertheless, in view of the required very high accuracy for the measurement unit, the distance between two light sensitive elements of the image measurement unit may be still too large, such that measurement errors may not be determined with the required accuracy. Only using an integer number of pixel positions for the determination of the offset, for example of an offset in x and y direction, may lead to imprecise determination of the measurement error. Thus in a further embodiment the offset may be determined on the basis of interpolating between pixel values of the first digital image and on the basis of interpolating between pixel values of the second digital image, with an accuracy that is higher than a pixel interval, that is the distance between 2 light sensitive elements of the image sensor unit. For the interpolation not only the individual pixel values of the digital image are considered, but also interpolated values between neighboring pixels. For example a further pixel position could be defined between two real existing pixel values of the image sensor unit, having a mean pixel value, and be used for determining the offset. Interpolation methods are known in the art.

In a further embodiment the position of the line of sight on the images sensor unit may be defined as a light-sensitive element of the image sensor unit, preferably the center point thereof. However, it is also conceivable that the position of the line of sight on the image sensor unit is defined using a position that is between two light sensitive elements, such that a position of the line of sight on the image sensor unit needs to be determined with an accuracy that is higher than a pixel interval, i.e. the distance between two light sensitive elements of the image sensor unit.

It was outlined that the characteristic image area of the first digital image needs to be found in the second digital image by means of image processing schemes. For this purpose it is required that the characteristic image area as far as possible differs from other areas of the first digital image. In the case of repeating patterns in the digital image a characteristic image area could be partially or in its entirety be repeated at different positions of the first digital image, such that a nonambiguous recovery of the characteristic image area in the second digital image is difficult or impossible.

In a further embodiment it may therefore be determined before using the characteristic image area, whether the characteristic image area is sufficiently distinct from other image areas of the first digital image. For this purpose a correlation of the characteristic image area of the first digital image and other image areas of the first digital image may be carried out, and by means of comparison of the correlation results with an autocorrelation result of the characteristic image area it may be determined whether the characteristic image area sufficiently differs from other image areas.

Herein the autocorrelation result of the characteristic image area constitutes a correlation result of the characteristic image area with itself, thus the characteristic image area is correlated with itself. Furthermore, correlation results for different positions of the characteristic image area in the first digital image are calculated, and compared with the autocorrelation result.

If for example a plurality of correlation results at a plurality of positions of the characteristic image area in the first digital image corresponds to the autocorrelation result of the first characteristic image area, then the characteristic image area is presumably not significant or distinctive. However, if no correlation result of the respective possible positions of the characteristic image area in the first digital image corresponds to the autocorrelation result of the characteristic image area, then it can be assumed that the characteristic image area is distinctive, in other words, that the characteristic image area is present in the first digital image only once. In the other above outlined case, in the case of a non-distinctive characteristic image area the characteristic image area would be present multiple times, at least in similar shape, in the first digital image and thus would not be meaningful.

According to a further embodiment it is desirable that the characteristic image area does not significantly change during the measurements in the first face and the second face. If the characteristic image area varies between the first imaging process, that is between obtaining the first digital image and the obtaining of the second digital image in the second face of the measurement unit, this may negatively influence the determination of the measurement error. Accordingly the recording unit 1201 may be adapted to obtain at least a further digital image with the line of sight of the optical arrangement in the first face, and the image processing unit 1202 may be adapted to carry out a comparison of the characteristic image area of the first digital image with a characteristic image area of the further digital image, and to determine on the basis of the comparison whether an image scene is invariable.

For example, the recording unit may carry out a correlation of the characteristic image area of the first digital image with a characteristic image area of the further digital image, for determining on the basis of the correlation result whether an image scene is invariable.

Alternatively or in addition thereto at least one difference image may be calculated from the first digital image and the at least one further digital image with the line of sight of the optical arrangement of the image sensor unit in the first face. On the basis of the difference images it may be determined whether the image scene is invariant.

For example the characteristic image area in the first obtained digital image may be correlated with the characteristic image area at the same positions of the further obtained images. If the correlation results between the respective obtained digital images differ, the image scene in the characteristic area presumably is not time invariant.

For the comparison the autocorrelation result of the characteristic image area in the first obtained digital image can be compared with the correlation result of the characteristic image area from the first obtained digital image with a second obtained digital image. If the autocorrelation result differs from the correlation result, a time based variation of the images scene presumably took place. Time invariance of the image scene, particularly in the characteristic area, is important throughout the entire duration of the determination of the measurement area in this embodiment. Frequent error sources herein are constituted by the time variant position of objects, for example if a vehicle in the characteristic area is in motion, or if branches, leaves or similar are moved by the air, or if there is a change in illumination, brightness or similar of the image scene.

For reducing time invariance in the obtained digital images, the recording unit 1201 may in a further embodiment be adapted to obtain at least a further digital image in the first face of the optical arrangement and at least a second digital image in the second face of the optical arrangement. The respective images may then be averaged. The determination of the measurement error is then carried out on the basis of the average digital image in the first face and the average to digital image in the second face.

As already noted, the described embodiments may be combined with one another according to circumstances, section that in an embodiment one of other features of a further embodiment are realized.

Figure 2:
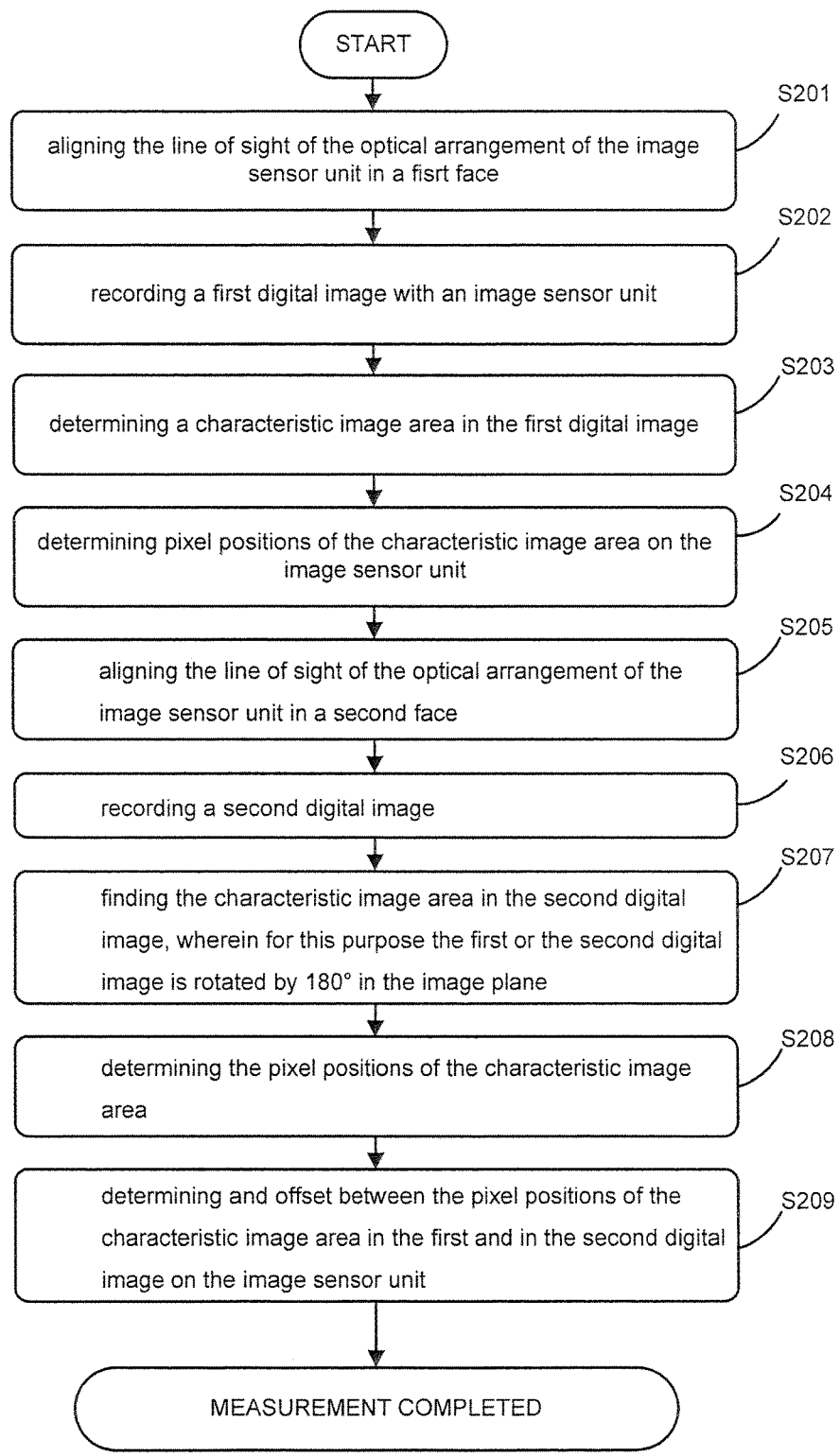
FIG. 2 illustrates a flow chart of operations of for determining a measurement error of a measurement device according to an embodiment of the invention.

FIG. 2 illustrates method operations for determining a measurement error of a measurement device according to a further embodiment of the invention.

The method operations may for example be carried out using the measurement device from FIG. 1, however, FIG. 2 is not limited thereto. In a first operation S201 upon starting the determination of the measurement error of the measurement device, the line of sight of the optical arrangement of an image sensor unit is oriented in a first face direction. The first face of the optical arrangement herein is, as known in the art, for example as shown in FIG. 11, the orientation of the line of sight of the optical arrangement in a first internal configuration of the measurement unit. The second face of the optical arrangement can be realized by rotating the optical arrangement of the image sensor unit by 180° around the vertical axis, see for example FIG. 11, and by rotating the image sensor unit with the optical arrangement by 360° minus a vertical angle to the rotational axis around a horizontal axis. Following thereto, at least in a measurement unit without error, the line of sight is again exactly oriented in the same direction, however, with a second internal configuration of the measurement unit. The above constitutes one option of instructions for orienting the measurement unit in a first and a second face direction. Further instructions for orienting in a first and the second face with the line of sight in the same direction with the same effect are conceivable, for example if the vertical angle is defined differently.

As noted, after the procedure of rotating by 180° around the vertical axis and by 360° minus a vertical angle around the horizontal axis only in an ideal measurement unit the line of sight is oriented exactly in the same direction without error. In any real world measurement unit, however, errors will be present due to production tolerances, on the basis of which the line of sight after orienting it in the second face direction, also slip through of the measurement unit, will not be oriented in exactly the same direction. Tolerances may be inaccuracies caused by the production process, for example in orienting the axes of the measurement unit with respect to one another, leading to misalignments and thus errors in the angle determination. The misalignment of the line of sight in the first face versus the second face is considered to constitute the measurement error. It is advantageous to obtain knowledge on the size of this measurement error, to compensate it if possible, or to correspondingly calibrate the measurement unit.

In accordance with the present embodiment for this purpose the image sensor unit obtains a first digital image in a first operation S202. Since the line of sight of the optical arrangement is oriented towards a suitable object, the first digital image will represent this object.

The image sensor unit includes, as noted, preferably a plurality of light sensitive elements, and the first obtained digital image includes a corresponding number of image positions or pixels.

Then, in a method operation S203, a characteristic image area in the first digital image is determined. This characteristic image area may be defined by a geometrical shape around the position of the line of sight on the image sensor unit, that is in the first digital image, for example a square, a rectangle, a circle, and similar, as noted, and also by the entire first digital image.

In a method operation S204 pixel positions of the characteristic image area are determined on the image sensor unit, that is the light sensitive elements of the image sensor unit, which correspond to the characteristic image area of the first digital image.

Following thereto in an operation S205 the line of sight of the optical arrangement of the image sensor unit is oriented in the second face, by performing a slip through of the measurement unit, as described. Due to the errors occurring in the real world, the line of sight of the optical arrangement in the second face is not, or at least not identical to, the orientation of the line of sight of the optical arrangement in the first face direction.

In an operation S206 a second digital image is obtained using the image sensor unit.

In an operation S207 then the characteristic image area in the second digital image is searched, for which purpose the first or the second digital image is rotated by 180° in the image plane, or was rotated in this manner using the image processing unit 1202. The rotation by 180° is required, sense with bringing the optical arrangement of the measurement unit from the first face into the second face the optical arrangement is rotated by 180°.

Due to errors this a rotation will, however, not be exactly 180°, but only approximately 180°.

In an operation 208, after the characteristic image area in the second digital image was found, the pixel positions of the characteristic image area in the second digital image are determined.

In an operation S209 then an offset between the pixel positions of the characteristic image area in the first and in the second digital image on the image sensor unit are determined.

This offset quantifies the measurement error of the measurement device.

This offset can be constituted by at least a translational and/or rotational offset of the characteristic image area or the first digital image versus the second digital image.

Since for example on the basis of the errors the line of sight in the second face does not fully correspond to the direction of the line of sight in the first face direction, and since furthermore the rotation of the optical arrangement due to errors may not exactly be 180°, the obtained second digital image may be translated or rotated, or translated and rotated, respectively, on the image sensor unit, by some extent as compared to the obtained first digital image.

On the basis of the thus determined measurement error a measurement obtained by the measurement unit may be corrected, such that a measurement result is error free. Preferably the aligning unit 1203 may be adapted to aim at an object of interest before obtaining by the recording unit 1201 the first and the second digital image of the object of interest in the first and second face of the image sensor unit, as for example described with respect to the preceding embodiments, and the image processing unit 1202 may be adapted to correct on the basis of a such determined offset or measurement error an angle measurement of the object of interest carried out in the two face directions.

This may advantageously use the fact that the measurement error or the measurement offset corresponds to an angle error by which the optical unit is misaligned. Since by aiming at the object in the two face directions of the measurement unit the angle error has a double effect, the angle error determined on the basis of the offset, for example in horizontal and vertical direction, constitutes the double of the actual angle measurement error.

If due to the error of the first digital image is not exactly rotated versus the second digital image by 180°, a tilting axis error occurred. This tilting axis error can be quantified by determining the additional rotational angle by which the digital images needs to be rotated with respect to one another for being brought into coincidence with one another. The tilting axis error than is constituted by $K=\alpha/(2*\sin(V))$, Wherein K is the tilting axis error, $\alpha$ is the rotation of the image and V the zenith angle against the device horizon.

The method may therefore be used for correcting measurement errors of a single measurement of an object, by surveying this object in steps in the two telescope face directions and by thus determining the measurement error.

Figure 3:
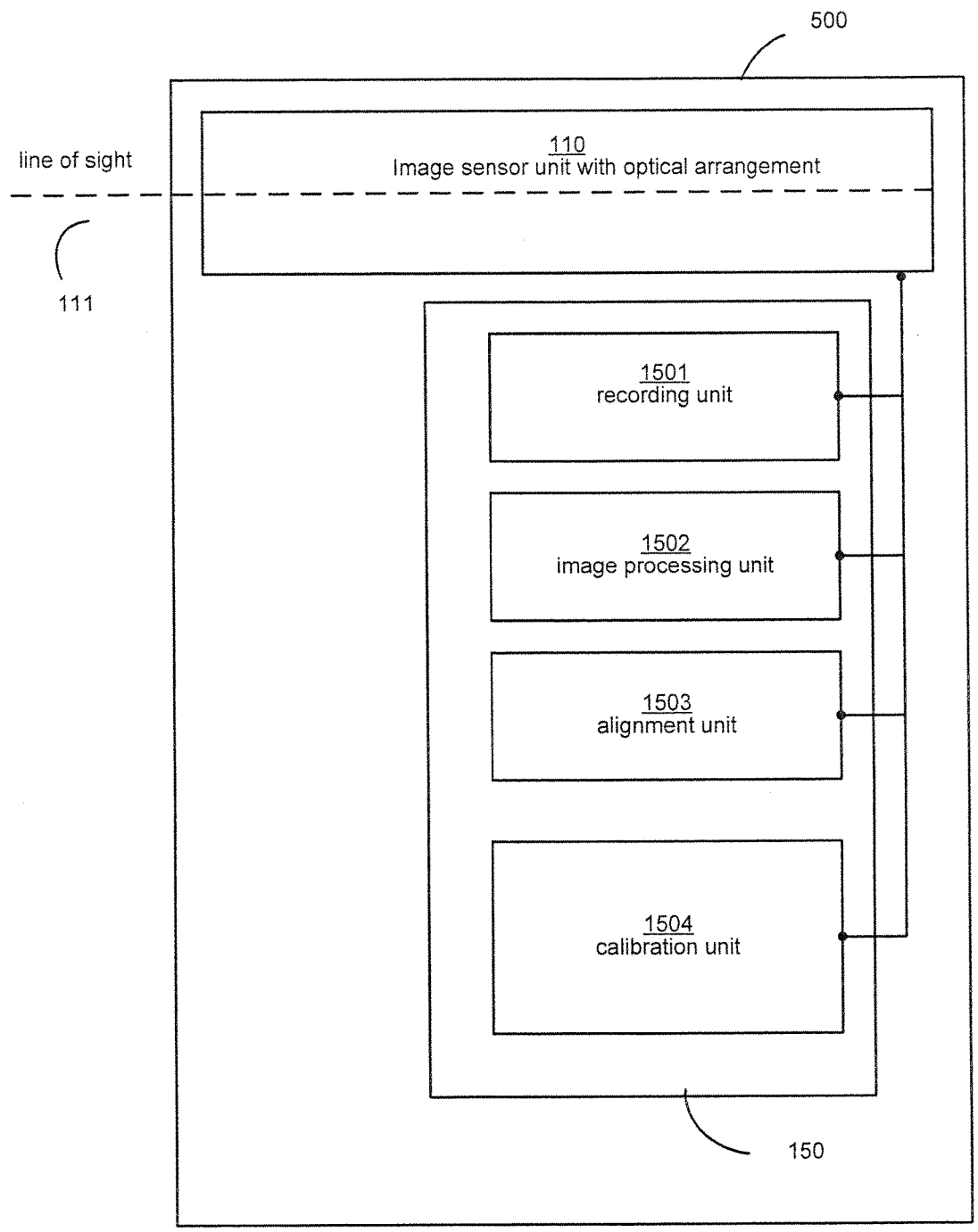
FIG. 3 illustrates a schematic arrangement of a measurement instrument with the device according to the invention for determining a measurement error according to a further embodiment of the invention.

FIG. 3 illustrates an arrangement of a measurement unit 500 according to a further embodiment of the invention.

The arrangement of FIG. 3 may be used to not only correct a measurement error in a single surveying operation/measurement of an object, but for calibrating the measurement unit as a whole by surveying/measuring the object, by using the determined measurement errors or angle errors for calibrating or properly aligning the measurement scales of the measurement unit.

The arrangement of the measurement unit according to FIG. 3 comprises the image sensor unit with the optical arrangement 110, as for example described with respect to FIG. 1, as well as the recording unit 1501, the image processing unit 1502 and the aligning unit 1503, as for example described with respect to FIG. 1, and in addition thereto a calibration unit 1504.

This calibration unit 1502 may be used to calibrate the measurement unit based on the measured offset, for example of translational nature, or on the basis of a rotation of the digital images with respect to one another, such that upon subsequent measurements no or at least reduced measurement errors occur. As noted, for this purpose the angle errors around the horizontal axis and vertical axis or tilting axis may be determined, and corresponding thereto the angles indicated by the measurement unit can be calibrated. Simply said, upon each measurement the respective angle error is subtracted or added from/to the actually measured angle, corresponding to the direction of the measurement error, and such only the corrected angle is indicated.

While the calibration unit, as shown in FIG. 3, may constitute part of the measurement error determination device 150, in other embodiments the calibration unit 1504 may also be arranged external thereto, for example on an external data processing device, being in communication with the measurement unit 100. Further thereto, the calibration unit may be used upon shipment of the device to calibrate the measurement unit in view of the desired orientation of the line of sight, and may then be decoupled from the measurement unit. This coupling may be carried out again for subsequence calibrations, for example on a time basis, physically or based on data with the measurement unit, for carrying out a renewed calibration.

During calibration in an automated scheme the measurement unit may be driven into the respective directions of the line of sight, in the respective first and second face directions, and the respective measurement error and thus calibration angle be determined.

The calibration unit may be realized in software/hardware. For example a program of the calibration unit 1504 may be provided on a computer readable medium and may be executed for performing the calibration method on a data processing unit inside or external to the measurement instrument.

Figure 4:
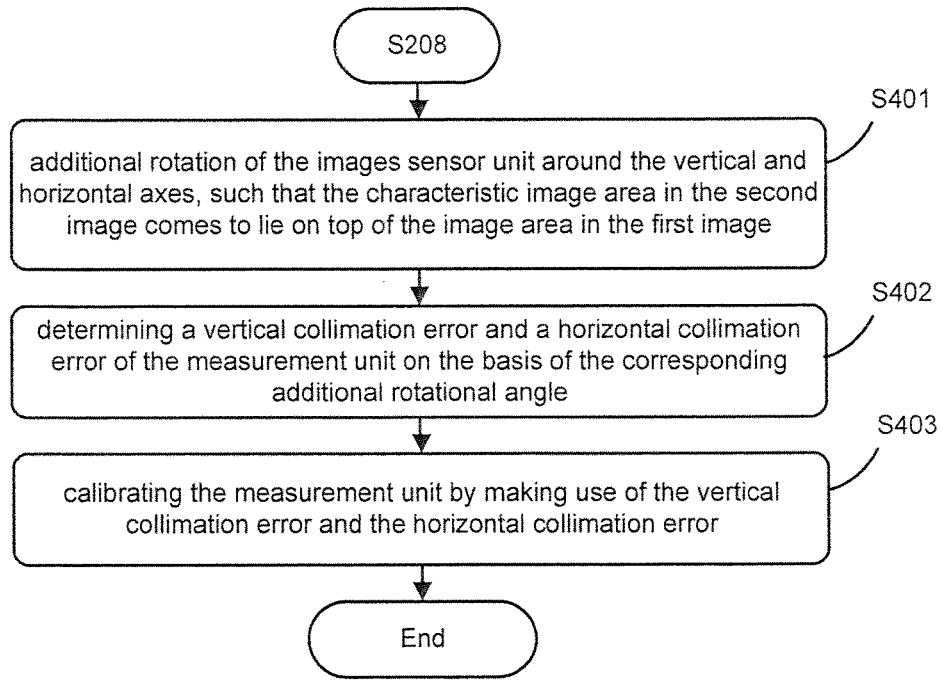
FIG. 4 illustrates method operations for determining a vertical and horizontal collimation error according to a further embodiment of the invention.

A further embodiment of the invention will be described with respect to FIG. 4. FIG. 4 shows an embodiment for determining a vertical and horizontal angle error, a vertical collimation error and a horizontal collimation error of the measurement device. The vertical collimation error herein is a deviation of to the measured vertical angle from the actual particular angle of the line of sight, and the horizontal collimation error is a deviation of the horizontal angle from the actual horizontal angle.

According to the embodiment the aligning unit 1503 is instructed in operation S401 to orient the image sensor unit by additional rotation around the vertical axis and horizontal axis such that the characteristic image area in the second image comes to lie on top of the characteristic image area in the first image. Operation S401 may in this case for example be carried out after the operation S208 of FIG. 2, however, FIG. 4 is not limited thereto.

As noted, after driving the measurement unit into the second face the line of sight, it is not exactly in the same direction as compared to the direction in the first face direction. By additional rotation around the vertical and horizontal axes, however, the respective line of sight in the second and first face can be brought into exact alignment with one another. This is achieved in that the characteristic image area in the second image comes to lie on the characteristic image area in the first image by the additional rotation of the arrangement, in other words, the two digital images are brought into correspondence with one another.

It is understood that the characteristic area may not only be a sub division of the digital image, but to may also be constituted by the entire image.

In operation S402 a determination of a vertical collimation error and of a horizontal collimation error of the measurement unit is performed on the basis of the corresponding additional rotational angle. The angles required for the additional rotation around the vertical axis and the horizontal axis are, as noted, respectively double of the angle error in vertical and horizontal direction.

Figure 5:
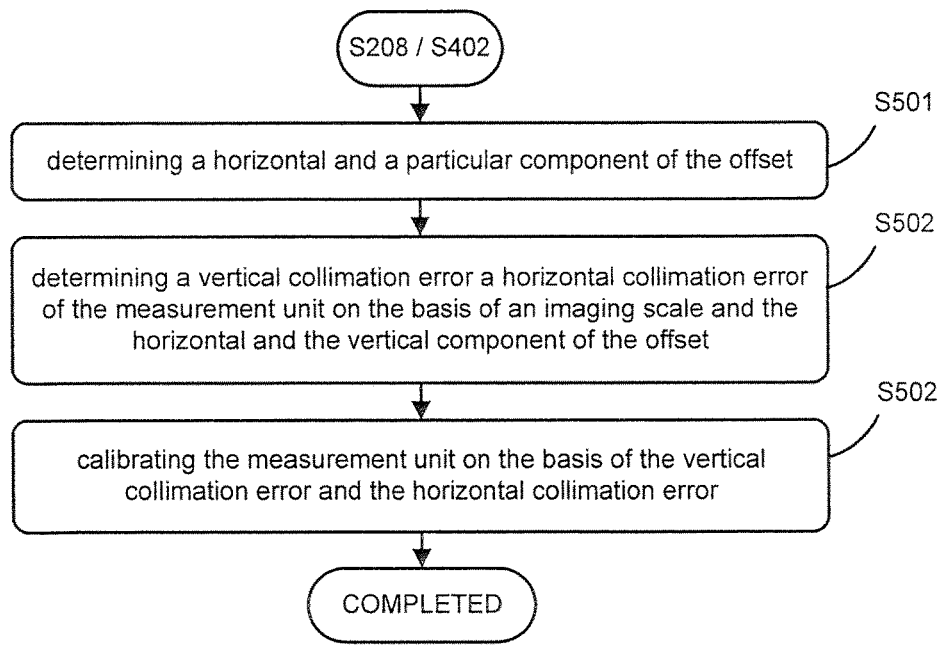
FIG. 5 illustrates method operations for determining a vertical and horizontal collimation error according to a further embodiment of the invention.

FIG. 5 illustrates operations for determining a measurement error according to another embodiment of the invention.

In this embodiment a vertical collimation error and a horizontal collimation error of the measurement unit are determined on the basis of an offset, for example as explained in connection with FIG. 1, and an imaging scale of the optical arrangement, and on the spaces the measurement unit may be calibrated.

In operation S501 a horizontal and a vertical component of an offset is determined. Operation S501 may for example follow the operation S208 from FIG. 2, however, is not limited thereto. A horizontal and a vertical component hereby is a shift of the first digital image as compared to the second digital image in the plane of the image sensor unit.

In a subsequence operation S502 the measurement unit may be calibrated using the vertical collimation error and the horizontal collimation error. Alternatively a single measurement by the measurement unit may be corrected, as noted. Determining the vertical collimation error and the horizontal collimation error on the basis of the horizontal and vertical components of the offset may also depend on the imaging scale. The imaging scale hereby constitutes the link between the offset in the image plane of the image sensor unit and an actual angle of rotation or additional rotation around the vertical and horizontal axis, for compensating the offset.

The imaging scale may be determined differently. A preferred option for determining the imaging scale of the optical arrangement is the focal distance of the optical arrangement, as with the focal distance a quantity describing the distance of the object to the measurement unit is obtained. Other methods for determining an imaging scale are conceivable, for example by way of laser measurement, etc.

In a further embodiment the operations of FIGS. 4 and 5 may be carried out consecutively, and in this case operation S501 of FIG. 5 may follow operation S402 of the figure. By means of this with the additional rotation of the optical arrangement of the image sensor unit a first part of the vertical collimation error and the horizontal collimation error may be determined. This first part could for example constitute an approximate determination of the vertical and horizontal collimation errors. Using the offset and the focal distance of the imaging unit a second or remaining part of the vertical collimation error and the horizontal collimation error may then be determined after the additional rotation. The first and the second part of the collimation error may then be added, for obtaining the accurate values of the vertical collimation error and the horizontal collimation error.

These operations may also be repeated iteratively, so that highest accuracy is obtained.

On the basis of the measured error or the measured errors the measurement unit may be calibrated or a single measurement result may be corrected.

Figure 6:
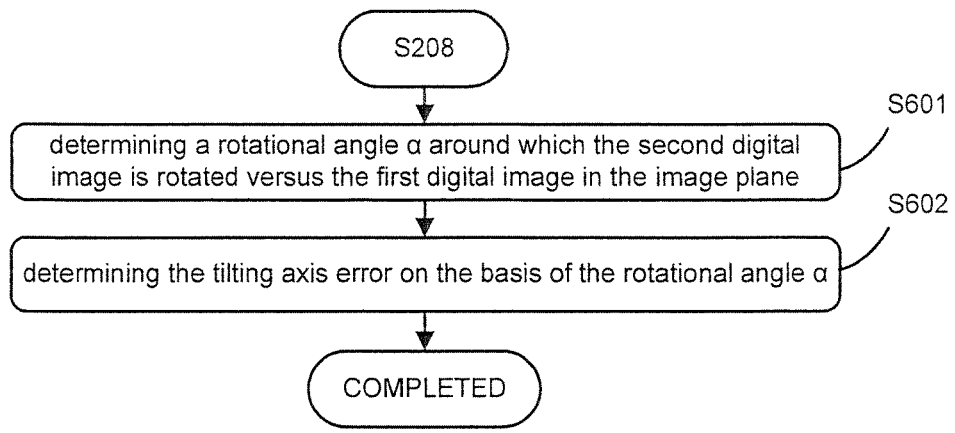
FIG. 6 illustrates method operations for determining a rotational angle and tilting error according to another embodiment of the invention.

FIG. 6 illustrates operations of a further embodiment of the invention for determining a tilting axis error.

Like the components of an offset in the imaging plane of the image sensor unit, a so-called translational offset, also the skew of the first digital image with respect to second digital image resulting from the tilting axis error in the two face directions may be determined as the offset.

In an operation S601 the rotational angle $\alpha$ is determined by which the second digital image is rotated as compared to the first digital image in the image plane of the image sensor unit, in addition to the 180° rotation.

In operation S602 the tilting axis error may be determined based on the rotational angle $\alpha$.

Preferably the rotation by the rotational angle $\alpha$ may be carried out around the position of the line of sight on the image sensor unit or in the digital image. Alternatively a center point of the characteristic image area in the first and second digital image may be used for the rotation.

After the characteristic image area of the first digital image has been found in the second digital image, for example by way of correlation, for example by way of a shift of the characteristic image area in the image plane of the image sensor unit, imaging techniques may be used to determine the additional rotation by the angle $\alpha$. For example, the additional rotational angle $\alpha$ may be determined by step by step skewing the digital images or the characteristic image area in the respective digital image with respect to one another and to determine the corresponding correlation results. At the desired additional rotational angle $\alpha$ the first and second digital images or the characteristic area will be placed on one another as accurate as possible, and the correlation result will be maximum.

In a further embodiment the tilting axis error of the measurement unit is not only determined by the additional rotational angle $\alpha$, but also on the basis of the selected vertical angle for the measuring of the object and the determination of the measurement error. This results from the fact that different vertical angles do have different influence of the tilting axis error, wherein the influence of the tilting axis error with the line of sight in horizontal direction is maximum and is minimum with the line sight in vertical direction.

Preferably the first or the second digital image in the image plane is rotated around the pixel position of the line of sight on the image sensor unit.

Figure 7:
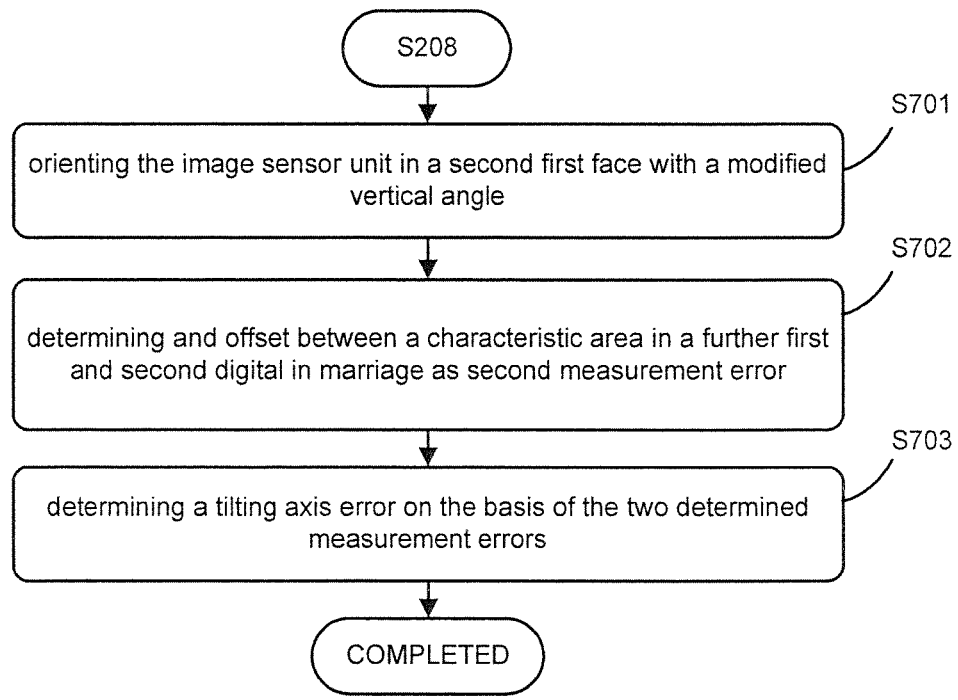
FIG. 7 illustrates the method operations regarding a tilting axis error according to another embodiment of the invention.

FIG. 7 illustrates a further embodiment of the present invention with operations for determining a tilting axis error. Operations according to FIG. 7 may follow operation S208 from FIG. 2, however, are not limited thereto.

In a first operation S701 the image sensor unit is oriented in a second first face with a changed vertical angle. The vertical angles should differ widely from one another, to lead to a meaningful and significant result.

In an operation S702 the offset between the characteristic area in a further first and second digital image is determined as second measurement error. This may correspond to the operations according to FIG. 2.

In an operation S703 is the tilting axis error is calculated on the basis of the two determined measurement errors.

In an embodiment a classical determination method is used to determine the tilting axis error k and the collimation error c as follows. Measured angles are:

$AHz^I$, $AV_{corr}^I$: horizontal angle and vertical angle in the first face to object A;
$AHz^{II}$, $AV_{corr}^{II}$: horizontal angle and vertical angle in the second face to object A;
$BHz^I$, $BV_{corr}^I$ horizontal angle and vertical angle in the first face to object B;
$BHz^{II}$, $BV_{corr}^{II}$ horizontal angle and vertical angle in the second face to object B;

The tilting axis error k and the collimation error c result as:

$$k = \frac{dBHz \cdot \sin(BV_{corr}) - dAHz \cdot \sin(AV_{corr})}{\cos(BV_{corr}) - \cos(AV_{corr})}$$

$$c = dAHz \cdot \sin(AV_{corr}) - k \cdot \cos(AV_{corr})$$

Wherein:
if $AHz^{II} > AHz^I$, then $dAHz = (AHz^{II} - AHz^I - \pi)/2$,
else $AHzII < AHz^I$, then $dAHz = (AHz^{II} - AHz^I + \pi)/2$
And
if $BHz^{II} > BHz^I$, then $dBHz = (BHz^{II} - BHz^I - \pi)/2$
else $BHz^{II} < BHz^I$, then $dBHz = (BHz^{II} - BHz^I + \pi)/2$ For this determination of the vertical angle difference between the object A and the object B should be as large as possible.

Mathematically exact the tilting axis error k and the collimation error c can be determined by:

$$\tan(c) = \frac{\tan(dAHz) \cdot \sin(AV_{corr}^I) - \sin(k) \cdot \cos(AV_{corr}^I)}{\cos(k)}$$

$$\sin(k) = \frac{\tan(dBHz) \cdot \sin(BV_{corr}^I) - \tan(dAHz) \cdot \sin(AV_{corr}^I)}{\cos(BV_{corr}^I) - \cos(AV_{corr}^I)}$$

Figure 8:
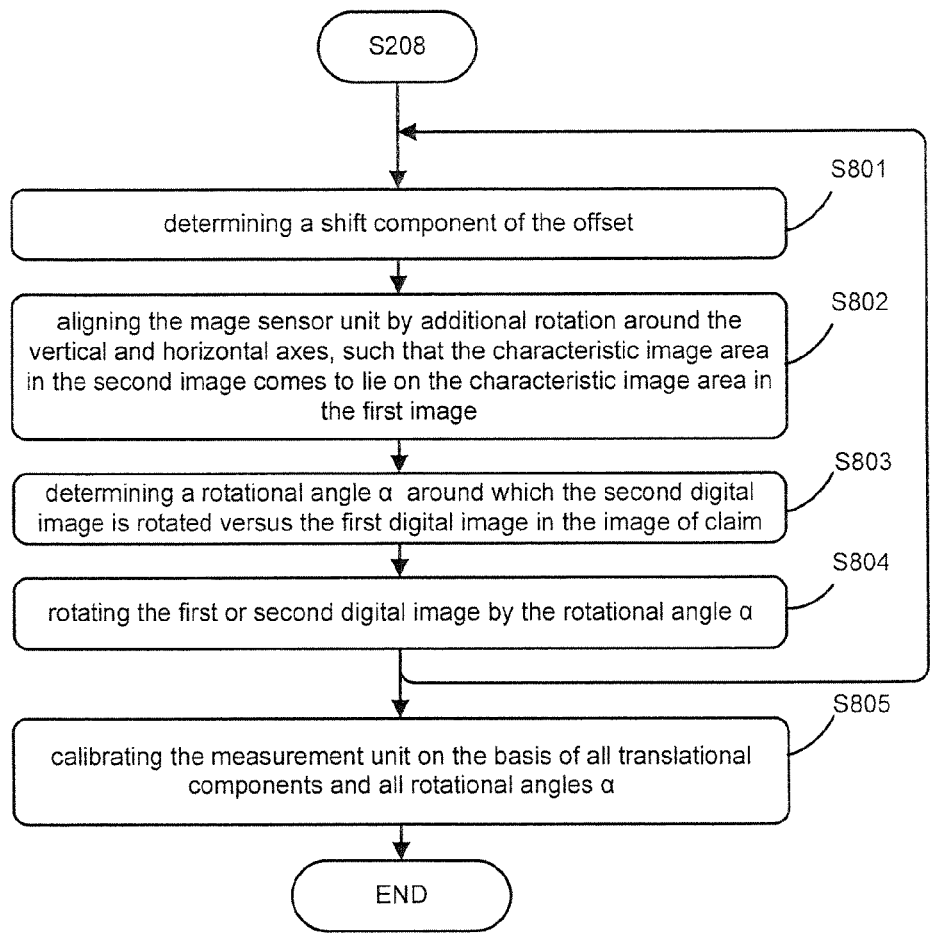
FIG. 8 illustrates measurement operations for iteratively calibrating the measurement device according to a further embodiment of the invention.

FIG. 8 illustrates a further embodiment of the present invention with operations for calibrating the measurement unit on the basis of the determined offset.

Operations according to FIG. 8 may follow the operations according to operation 208 in FIG. 2, however, are not limited thereto.

In accordance with FIG. 8 an iterative process is used. The offset contains a translational component and a rotational component, respectively in the image plane of the images sensor unit. The image processing device is adapted to determine in a first operation the offset and then to correct the offset, wherein the first and the second digital image are translated with respect to one another and rotated, wherein this operation or these operations are repeated at least once.

In an operation S801 a translational component of the offset is determined, for example in the image plane of the image sensor unit. In an operation S802 the images sensor unit is additionally adjusted by a rotation around the vertical and the horizontal axes is, such that the characteristic image area and the second image comes to lie on top of the characteristic image area in the first image, as for example set out with respect to the present embodiments.

In an operation S803 the additional rotational angle α is determined, by which the second digital image is rotated with respect to the first digital image in the image plane, for being brought into coincidence with one another.

In an operation S804 the first or second digital image is rotated by an angle α in the image plane. As a consequence the digital images will substantially come to lie on top of one another. The translation/shift in the image plane may be carried out before or after the determination and rotation of the first or second digital image by the additional rotational angle α.

For further improving the result the operations S801-S804 may be repeated, for arriving at a step-by-step improved correspondence between the first and the second digital image. Following thereto the measurement unit may be calibrated on the basis of all translational components and all additional rotational angles α, or a single measurement may be corrected.

Subsequently a further embodiment of the invention for determining a measurement error is outlined with respect to FIGS. 9a-9g.

Figure 9A:
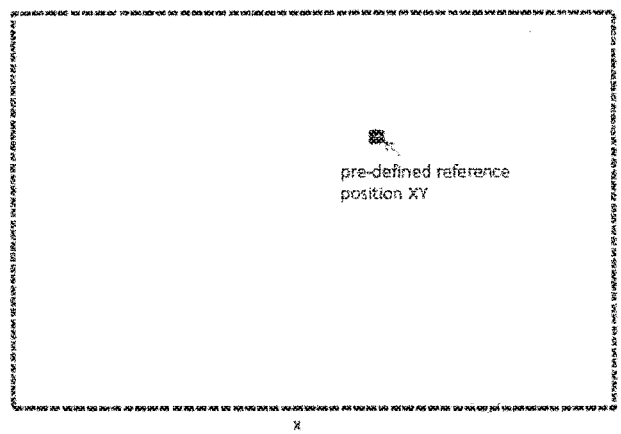
FIGS. 9a-9g illustrates display contents upon determining a measurement error of the measurement device according to a further embodiment of the invention.

In FIG. 9a the rectangle depicted using a broken line illustrates the images sensor unit in simplified manner. A predefined reference position Xz, Yz is determined on the image sensor unit. The reference position may be at an arbitrary position on the image sensor unit, in embodiments, however, also at the center position.

Figure 9B:
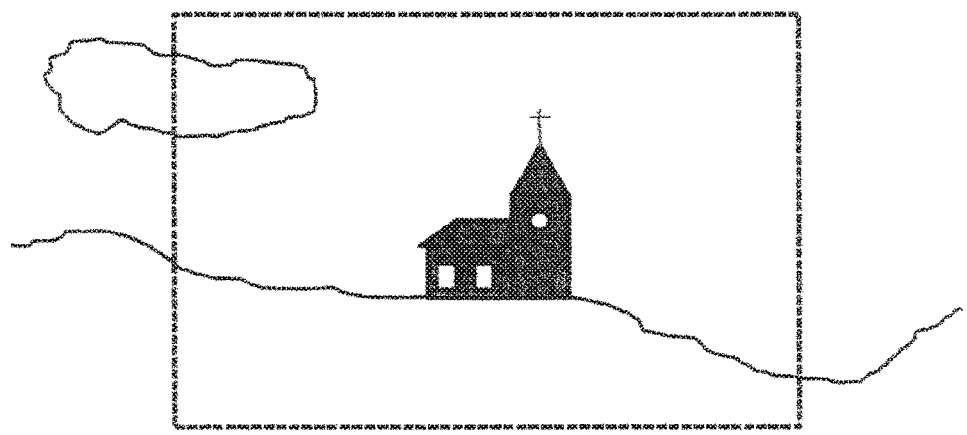
Figure 9C:
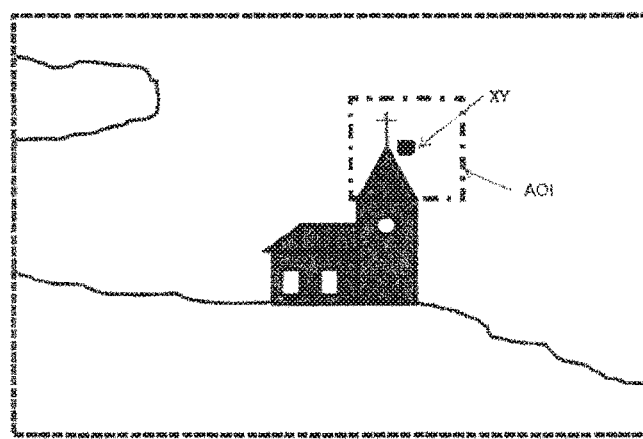

FIG. 9b illustrates an obtained first digital image after the line of sight was aimed at an object, in this case the tower of a church. Towers of churches are often of interest for surveying due to their prominent position in the field. FIG. 9c shows a predetermined characteristic image area in the first digital image AOI, in the present case a square around the position Xz, Yz.

Figure 9D:
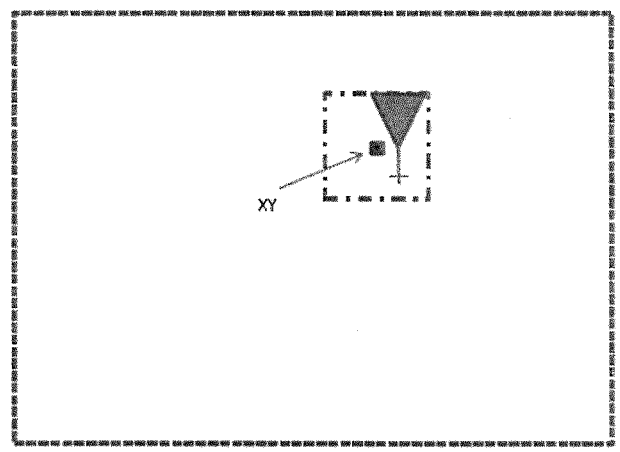

In FIG. 9d the characteristic image area of the first digital images rotated by 180°. The rotation herein preferably is carried out around the predefined position Xz, Yz.

Figure 9E:
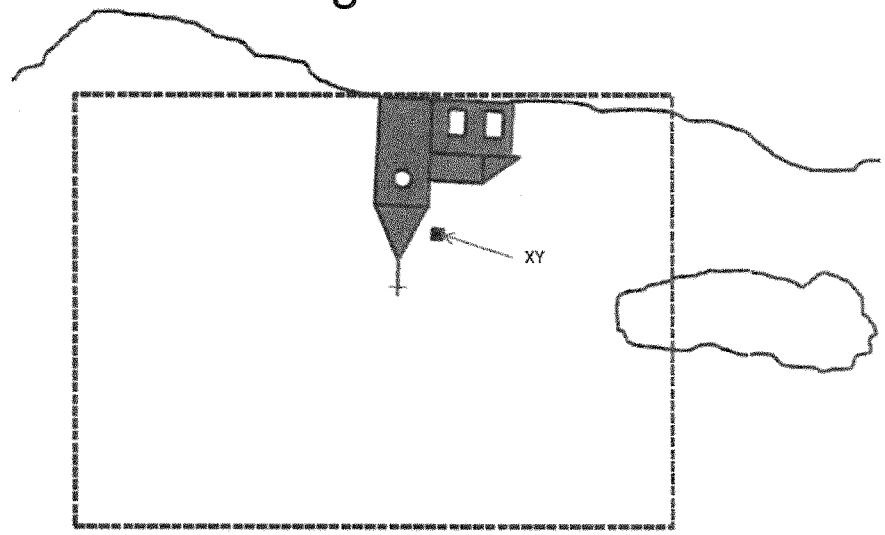

FIG. 9e illustrates an obtained second digital image, after the measurement unit or the optical arrangement brought into the second face direction, as described.

Figure 9F:
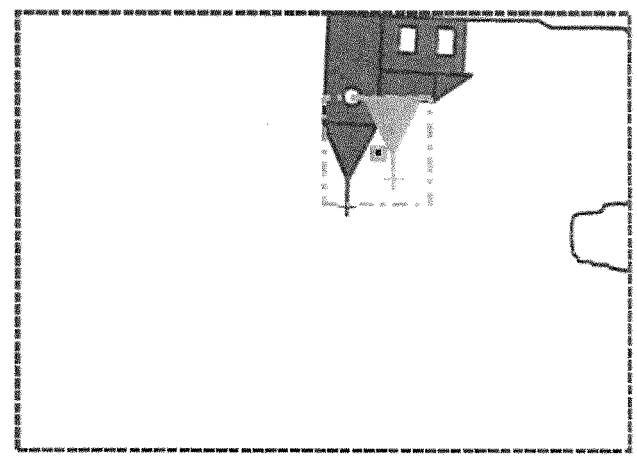

FIG. 9f illustrates an image area of the first digital image superimposed onto the second digital image. The offset between the characteristic image area in the first and the second digital image is clearly visible. It is noted that on the one hand the first digital image or the characteristic image area of the first digital image and on the other hand the second digital image may be rotated by 180°, for easier understanding in the present embodiment the rotation of the first digital image by 180° is selected.

Figure 9G:
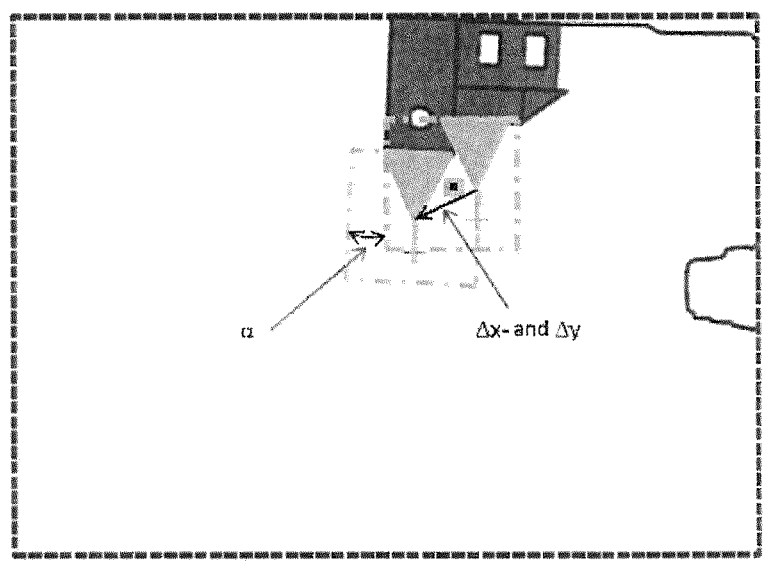

FIG. 9g now shows that the offset between the characteristic image area of the first and the second digital image, respectively determined by the relative position on the image sensor unit, can be determined. This offset may include a translational component ΔX, ΔY in the image plane and/or a rotational component around the additional angle α, as described.

Figure 10:
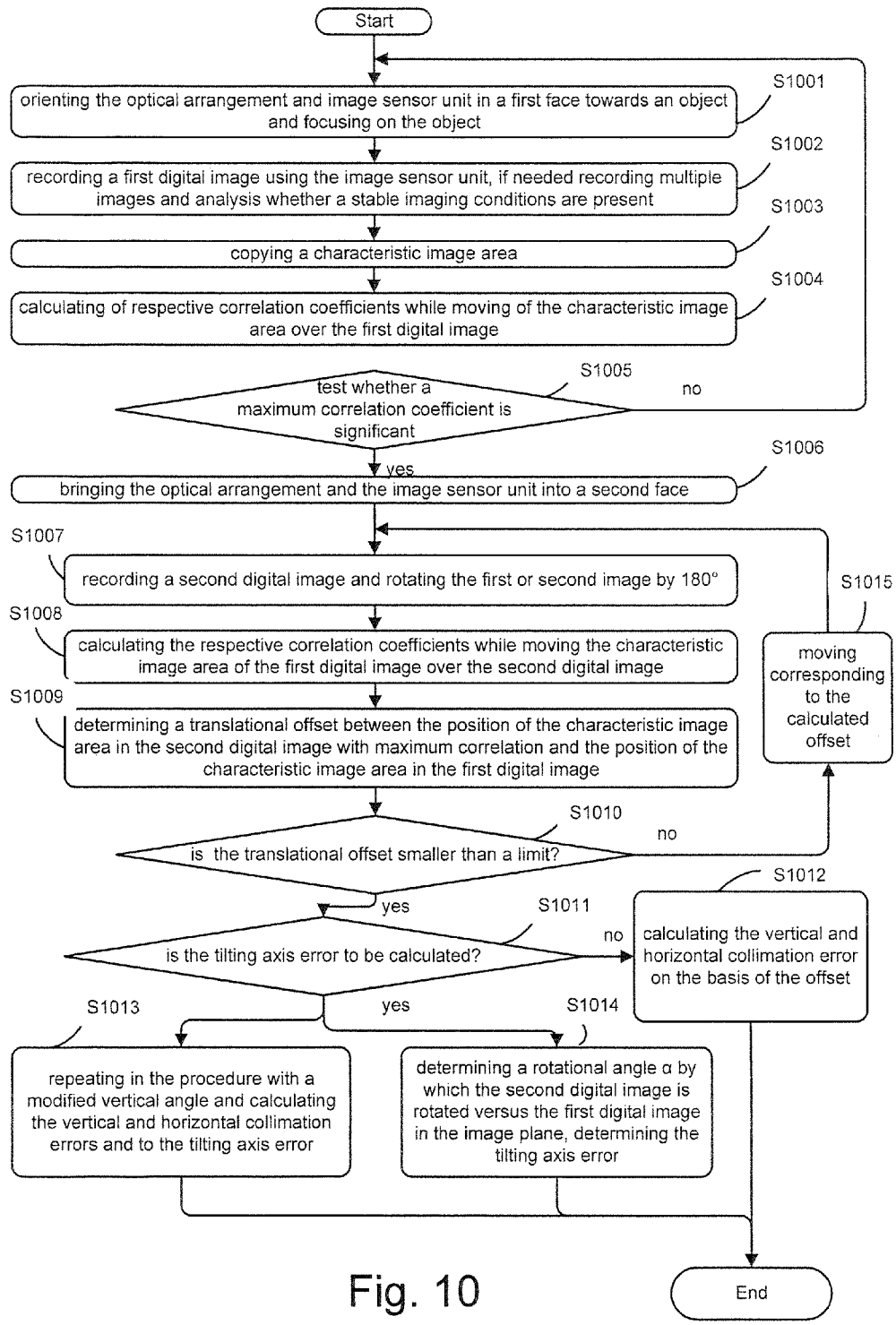
FIG. 10 illustrates method operations for determining measurement errors of a measurement device according to a further embodiment of the invention.

Below a further embodiment of the invention will be described with respect to FIG. 10. FIG. 10 illustrates operations for determining a measurement error, particularly for selectively determining horizontal and vertical collimation errors and tilting axis errors.

In a first operation S1001 the optical arrangement and the image sensor unit is oriented in a first face towards an object, and focused on the object.

In an operation S1002 a first digital image is obtained by means of the image sensor unit. It is an option to take a plurality of first the digital images, and to carry out an analysis whether a stable image environment is present, as outlined with respect to preceding embodiments.

In an operation S1003 the characteristic image area of the first digital image is determined and copied. In an operation S1004 the respective correlation coefficients are calculated, while the characteristic image area is moved over the first digital image. Herein the characteristic image area is moved over the first digital image step-by-step in xy direction, and correlation coefficients at the individual positions of the characteristic image area are calculated.

Following thereto in an operation S1005 it is determined whether a maximum correlation coefficient is significant. The correlation coefficient is significant if only one distinct maximum of the correlation efficient at the original position of the characteristic image area in the first digital image is present. If the characteristic image area itself or in similar form its present more than once in the first digital image, the correlation result will not be significant. If the correlation result is not significant in operation S105 the flow of operations returns operation S1001.

If the test result in operation S1005 leads to a significant correlation coefficient, in an operation S1006 the optical arrangement with the image sensor unit is driven into a second face direction, as described.

In an operation S1007 a second digital image is taken and the first or the second digital image is rotated by 180°, preferably exactly 180°. The rotation is carried out in the image plane, preferably around the position of the line of sight or the center point of the characteristic area on the image sensor unit.

In an operation S1008 the respective correlation coefficients are calculated, while the characteristic image area of the first digital image is moved over the second digital image. The correlation coefficients will be maximum, if the characteristic image area of the first digital image is precisely on top of her the corresponding area in the second digital image.

In an operation S1009 a translational offset between the position of the characteristic image area in the second digital image with maximum correlation and the position of the characteristic image area in the first instant image is determined.

In an operation S1010 it is determined whether the translational offset is smaller than a predefined limit. If this is not the case, the device is driven in operation S1015 into the newly determined position, i.e. moved corresponding to the calculated offset and a new second image is taken. Then the flow of operations is returned to operation S1007, and a new adjustment is taken, by focusing on to the same or another object. If the translational offset in S1010 is smaller than the predefined limit, it is determined whether also the tilting axis era is to be determined, in operation S1011. If this is not the case, in an operation S1012 the vertical and horizontal collimation errors are determined on the basis of the determined offset, as outlined with respect to preceding embodiments.

If in operation S1011 it is determined that the tilting axis error should be determined, in an operation S1013 according to a first option, the procedure is repeated with a changed vertical angle and the vertical and horizontal collimation errors and the tilting axis error are determined on the basis of the two measurements.

In a first alternative in an operation S1014 the rotational angle α may be determined, by which the second digital image is to be rotated versus the first digital image in the image plane, and the tilting axis error is determined. Besides this in operation S1014 also the vertical and horizontal collimation errors may be determined.

The operations may be implemented in hardware and/or software.

According to another embodiment a program may be provided including instructions configured to cause a data processing unit to carry out the method with the features of the above embodiments.

According to another embodiment a computer readable medium may be provided, incorporating the program.

According to another embodiment a computer program product may comprise the computer readable medium.

According to another embodiment an optical instrument is provided its including the measurement error determination device 120.

According to another embodiment an optical instrument is provided, which is calibrated in accordance with the above method operations of the above-described embodiments.

The invention claimed is:

1. A measurement device, comprising:
an image sensor configured to obtain a first digital image, wherein the first digital image is obtained with a line of sight of the image sensor oriented in a first face, and wherein the first digital image comprises a first plurality of pixels representing a characteristic area;
an alignment device configured to orient the line of sight of the image sensor in a second face,
wherein the image sensor is further configured to obtain a second digital image, wherein the second digital image is obtained with the line of sight of the image sensor oriented in the second face, and wherein the second digital image comprises a second plurality of pixels representing the characteristic area rotated by 180 degrees with respect to the characteristic area as represented in the first image;
an image processor configured to rotate one of the first and the second plurality of pixels by 180 degrees, wherein the image processor, after the rotation of the first or second plurality of pixels, is further configured to determine positions of the first plurality of pixels, to determine positions of the second plurality of pixels, and to determine an offset between the pixel positions of the first plurality of pixels and the pixel positions of the second plurality of pixels as a measurement error.

2. The device according to claim 1, including a calibration device for determining a vertical collimation error and a horizontal collimation error of the measurement device, by instructing the alignment device, to all resented the by additional rotation around the vertical axis and the horizontal axis such that the characteristic image area in the second image comes to lie on top of the characteristic image area in the first image, and to calibrate the measurement device on the basis of the corresponding additional rotational angle.

3. The device according to claim 2, including a calibration device for determining on the basis of the offset and an imaging scale of the optical arrangement a vertical collimation error and a horizontal collimation error of the measurement device, and to calibrate the measurement device based thereon.

4. The device according to claim 3, wherein the imaging scale of the optical arrangement is determined by a focal distance of the optical arrangement.

5. The device according to claim 3, wherein the calibration device is arranged to determine by the additional rotation of the optical arrangement of the image sensor first parts of the vertical collimation error and the horizontal collimation error, and to determine based on the offset and the focal distance of the image sensor second parts of the vertical collimation error and the horizontal collimation error.

6. The device according to claim 5, wherein the image processor is arranged to determine a rotational angle α as an offset by which the second digital image is rotated as compared to the first digital image in the image plane, and to determine the tilting axis error based on the rotational angle α.

7. The device according to claim 6, wherein the tilting axis error is determined on the basis of the rotational angle α and a vertical angle of the optical arrangement to the vertical rotational axis.

8. The device according to claim 1, wherein the first or the second digital image is rotated in the image plane around the pixel position of the line of sight on the image sensor.

9. The device according to claim 6, wherein the orientation device is arranged to orient the image sensor in a second first face with a modified vertical angle;
wherein the device is adapted to repeat the determination of the offset between a characteristic area in a further first and second digital image as second measurement error; and
the image processor is adapted determine the tilting axis error based on the determined measurement errors.

10. The device according to claim 1, wherein the offset includes a translational component and a rotational component in the image plane of the image sensor, and wherein the image processor is adapted to determine in an operation the offset, and then to correct the offset, by shifting and rotating the first and the second digital image with respect to one another, and wherein this operation is repeated at least once.

11. The device according to claim 1, wherein the alignment device is adapted to aim at an object of interest, for obtaining the first and second digital image of the object of interest in the first and second face of the image sensor, and wherein the image processor is adapted to correct an angle measurement carried out in the two faces on the object of interest on the basis of the determined offset.

12. The device according to claim 1, wherein the image processor is adapted to determine the characteristic image area in the first digital image as an area around a position of the line of sight on the image sensor.

13. The device according to claim 1, wherein the image processor is adapted to find the characteristic image area of the first digital image in the second digital image by correlating the pixel values of the characteristic image area of the first digital image with the pixel values of the second digital image and by determining a maximum correlation coefficient.

14. The device according to claim 1, wherein the image processor is adapted to determine the offset, by interpolating between pixel values of the first digital image and by interpolating between pixel values of the second digital image, with an accuracy that is greater than the one of a pixel interval.

15. The device according to claim 1, wherein the position of the line of sight on the image sensor is determined with an accuracy that is greater than the one of a pixel interval.

16. The device according to claim 1, wherein the image processor is adapted to carry out a correlation of the characteristic image area of the first digital image with other image areas of the first digital image, to determine on the basis of a comparison of the correlation results with an autocorrelation result of the characteristic image area, whether the characteristic image area is distinct from other image areas.

17. The device according to claim 1, wherein the image sensor is adapted to obtain at least a further digital image with the line of sight of the optical arrangement of the image sensor in the first face direction, and the image processor is adapted to carry out a comparison of the characteristic image area of the first digital image with a characteristic image area of the further digital image, and to determine on the basis of the comparison whether an image scene is invariant.

18. The device according to claim 1, wherein the image sensor is adapted to obtain at least a further digital image in the first face and in the second face of the optical arrangement, and to average the respective images in the first face and the second face.

19. A method for determining a measurement error of a measurement device, including:
obtaining a first digital image using an image sensor, wherein a line of sight of an optical arrangement of the image sensor is oriented in a first face, and wherein the first digital image comprises a first plurality of pixels representing a characteristic area;
obtaining a second digital image using the image sensor, wherein the line of sight of the optical arrangement of the image sensor is oriented in a second face, and wherein the second digital image comprises a second plurality of pixels representing the characteristic area rotated by 180 degrees with respect to the characteristic area as represented in the first image;
rotating one of the first and the second plurality of pixels by 180 degrees with an image processor;
after the rotation of the first or second plurality of pixels and with the image processor, determining positions of the first plurality of pixels, determining positions of the second plurality of pixels, and determining an offset between the pixel positions of the first plurality of pixels and the pixel positions of the second plurality of pixels as a measurement error;
determining the pixel positions of pixels of the characteristic image area in the second digital image on the image sensor; and
determining and offset between the pixel positions of the characteristic image area in the first digital image on the image sensor and the pixel positions of the characteristic image area in the second digital image on the image sensor as a measurement error.

20. A non-transitory computer-readable medium having instructions stored thereon that when executed on a processor, cause the processor to perform the method according to claim 19.

* * * * *